(12) United States Patent
Mishima et al.

(10) Patent No.: US 7,366,081 B2
(45) Date of Patent: Apr. 29, 2008

(54) INFORMATION RECORDING MEDIUM

(75) Inventors: Koji Mishima, Tokyo (JP); Daisuke Yoshitoku, Tokyo (JP); Kenji Yoneyama, Tokyo (JP); Takashi Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 615 days.

(21) Appl. No.: 10/984,964

(22) Filed: Nov. 10, 2004

(65) Prior Publication Data

US 2006/0098563 A1    May 11, 2006

(51) Int. Cl.
*G11B 7/24* (2006.01)
(52) U.S. Cl. .............................. 369/275.4; 369/275.5; 428/64.1
(58) Field of Classification Search ...................... None
See application file for complete search history.

(56) References Cited

U.S. PATENT DOCUMENTS

| | | | | |
|---|---|---|---|---|
| 5,936,934 | A * | 8/1999 | Kuribayashi et al. | 369/286 |
| 6,037,099 | A * | 3/2000 | Oogo et al. | 430/270.11 |
| 6,063,468 | A * | 5/2000 | Aratani et al. | 428/64.1 |
| 6,201,783 | B1 * | 3/2001 | Arakawa et al. | 369/275.1 |
| 6,411,593 | B1 * | 6/2002 | Yoon et al. | 369/275.4 |
| 6,847,594 | B1 * | 1/2005 | Lee | 369/44.13 |
| 6,908,655 | B2 * | 6/2005 | Arakawa et al. | 428/64.1 |
| 2003/0184891 | A1 * | 10/2003 | Hosoi et al. | 359/883 |
| 2006/0075419 | A1 * | 4/2006 | Mishima et al. | 720/718 |
| 2006/0077871 | A1 * | 4/2006 | Inoue et al. | 369/275.1 |
| 2006/0098562 | A1 * | 5/2006 | Yoshitoku et al. | 369/275.3 |
| 2006/0099459 | A1 * | 5/2006 | Yoshitoku et al. | 428/824.1 |

FOREIGN PATENT DOCUMENTS

| | | | |
|---|---|---|---|
| JP | 58-158036 | 9/1983 | |
| JP | 3-57540 | 9/1991 | |
| JP | 3-232131 | 10/1991 | |
| JP | 7-109660 | 11/1995 | |
| JP | 7-307036 | 11/1995 | |
| JP | 9-138972 | 5/1997 | |
| JP | 2003-048375 | 2/2003 | |
| JP | 2004-118966 | * 4/2004 | 369/275.5 |

OTHER PUBLICATIONS

English Language Abstract of JP 9-138972.
English Language Abstract of JP 58-158036.
English Language Abstract of JP 3-232131.
English Language Abstract of JP 7-307036.
English Language Abstract of JP 2003-48375.

* cited by examiner

*Primary Examiner*—Tan Dinh
(74) *Attorney, Agent, or Firm*—Greenblum & Bernstein, P.L.C.

(57) ABSTRACT

An information recording medium according to the present invention includes a recording layer that is formed of a single layer of a single type of recording material and is directly sandwiched by a pair of resin layers, the information recording medium being constructed so that at least one resin layer out of the pair of resin layers deforms due to deformation of the recording layer that is caused by irradiation with laser light for recording data and a track pitch is in a range of 0.1 μm to 0.5 μm, inclusive, wherein the pair of resin layers are formed with respective Young's moduli in a range of 415 MPa to 7100 MPa, inclusive.

2 Claims, 2 Drawing Sheets

INFORMATION RECORDING MEDIUM

BACKGROUND OF THE INVENTION

1. Field of the Invention

The present invention relates to an information recording medium that includes a recording layer directly sandwiched between a pair of resin layers and is constructed so that data can be recorded by deforming at least one of the two resin layers through deformation of the recording layer due to irradiation of laser light for recording data.

2. Description of the Related Art

As one example of this kind of information recording medium, an optical information recording medium disclosed by Japanese Laid-Open Patent Publication No. H09-138972 is known. This optical information recording medium is constructed by forming an intermediate layer, a light absorbing layer, a light reflecting layer, and a protective layer (hereinafter, collectively referred to as "functional layers" when no distinction is required) in that order on a substrate in which pregrooves have been formed with a pitch (track pitch) of around 1.6 μm. In this case, the respective functional layers are formed by sputtering or by spin coating. In this optical information recording medium, the light absorbing layer expands (deforms) due to the laser light used for data recording that is irradiated from the substrate side, and data is recorded by pits being formed due to the intermediate layer or the substrate deforming due to the expansion of the light absorbing layer. When data recorded on the optical information recording medium is reproduced (read), laser light for reproducing data is irradiated from the substrate side and the resulting reflected light is received. In this case, the intensity of the reflected light differs between positions where pits have been formed and other positions, so that it is possible to read recorded data by detecting the intensity of the received reflected light.

However, by investigating the conventional optical information recording medium, the present inventors discovered the following problem. The optical information recording medium includes a large number of functional layers formed by sputtering or spin coating. On the other hand, under present conditions where price competition for information recording media is becoming fierce, it is important to simplify the manufacturing process so as to reduce manufacturing costs. However, when manufacturing the above conventional optical information recording medium, a large number of sputtering or spin coating operations are necessary to form the large number of functional layers described above, and due to such processes, there is the problem that it is difficult to reduce the manufacturing cost.

SUMMARY OF THE INVENTION

The present invention was conceived in view of the problems described above and it is a principal object of the present invention to provide an information recording medium that can achieve the optical characteristics required for the reliable recording and reproduction of data while reducing the manufacturing cost.

To solve the above problems, an information recording medium according to the present invention includes a recording layer that is formed of a single layer of a single type of recording material and is directly sandwiched by a pair of resin layers, the information recording medium being constructed so that at least one resin layer out of the pair of resin layers deforms due to deformation of the recording layer that is caused by irradiation with laser light for recording data and a track pitch is in a range of 0.1 μm to 0.5 μm, inclusive, wherein the pair of resin layers are formed with respective Young's moduli in a range of 415 MPa to 7100 MPa, inclusive. It should be noted that a "single type of recording material" for the present invention includes a material in which the proportions of the elements composing the recording materials somewhat differs. Accordingly, "a recording layer that is formed of a single layer" for the present invention includes both a layer in which the proportions of the respective elements composing the recording material are the same across the entire layer and a layer including parts where the proportions of the respective elements somewhat differ to one another.

In this information recording medium, the recording layer is formed of a single layer of a single type of recording material and is directly sandwiched by a pair of resin layers, with the Young's moduli of both resin layers being set in a range of 415 MPa to 7100 MPa, inclusive. For this reason, it is possible to achieve the optical characteristics required for the reliable recording and reproduction of data. Accordingly, since it is possible to manufacture an information recording medium for which the reliable recording and reproduction of data are possible without providing functional layers such as an intermediate layer or a reflective layer, the manufacturing process of an information recording medium can be simplified by an amount corresponding to the omission of processes for forming such functional layers. As a result, the manufacturing cost of an information recording medium can definitely be reduced.

In this case, out of the pair of resin layers, a resin layer positioned on an incident side for laser light used for reading data may be formed with a higher Young's modulus than a Young's modulus of another resin layer out of the pair of resin layers. With this construction, the optical characteristics required for a more reliable recording and reproduction of data can be realized.

The recording material may be formed of a material that includes elements Bi and O as main components and in which the proportion of O atoms with respect to the total number of Bi and O atoms is in a range of 63% to 77%, inclusive. With this construction, data can be recorded and read using blue or blue-violet laser light (with a wavelength in a range of around 350 nm to 450 nm).

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of an information recording medium according to the present invention will now be described with reference to the attached drawings.

First, the construction of an optical recording medium 1 will be described with reference to the drawings.

Figure 1:
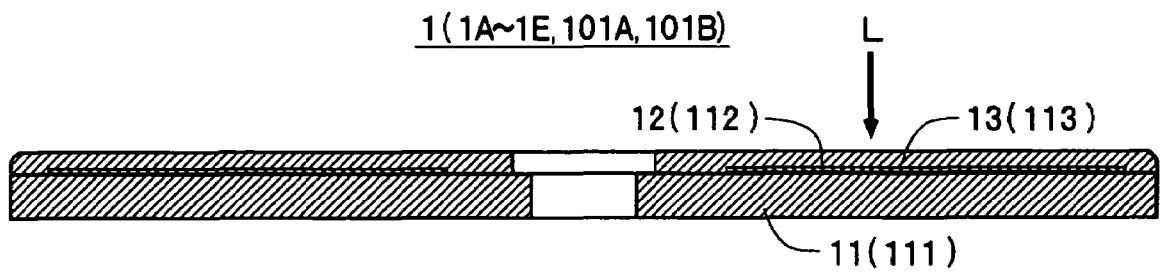
FIG. 1 is a cross-sectional view showing an optical recording medium.

The optical recording medium 1 is one example of an information recording medium according to the present invention and as shown in FIG. 1, includes a substrate 11, a recording layer 12 formed on a surface (the upper surface in FIG. 1) of the substrate 11, and a light transmitting layer 13 formed so as to cover the recording layer 12. Also, as shown in FIG. 1, the optical recording medium 1 is constructed so that data can be recorded and read by irradiation with blue or blue-violet laser light L with a wavelength ($\lambda$) in a range of 350 nm to 450 nm, inclusive (as one example, laser light L with a wavelength of 405 nm) from the light transmitting layer 13 side.

Figure 2:
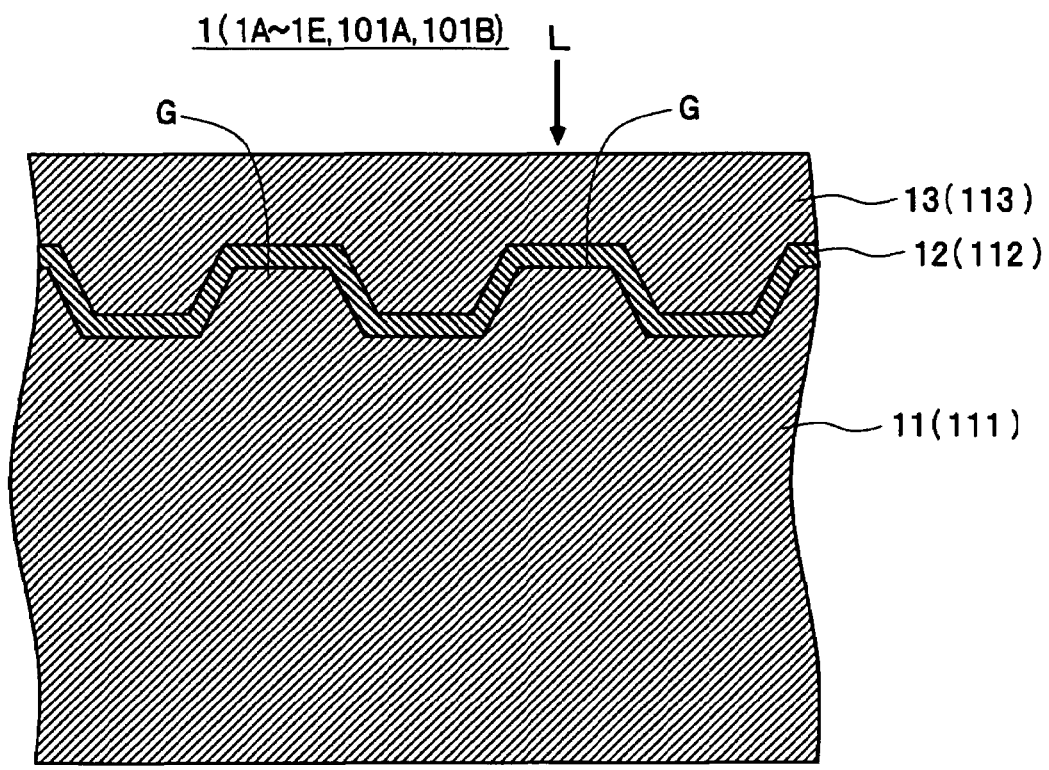
FIG. 2 is a cross-sectional view of a substrate, a recording layer, and a light transmitting layer.

The substrate 11 corresponds to "the other resin layer" out of "the pair of resin layers" for the present invention, transmits light, and is formed in a disc shape (a plate-like shape) with a diameter of around 120 mm, a thickness of around 1.1 mm, and a Young's modulus in a range of 1000 MPa to 3000 MPa, inclusive, by injection molding polycarbonate, for example. It should be noted that by using various resin materials and/or one or two or more composite materials, the substrate 11 can be formed with a Young's modulus in a range of 415 MPa and 7100 MPa, inclusive. Also, as shown in FIG. 2, a groove G is formed in a spiral from a central part to an outer edge part on one surface (the upper surface in FIG. 2) of the substrate 11. In this case, the groove G functions as a track when recording or reading data on the recording layer 12 using the blue or blue-violet laser light L described above. Accordingly, to make proper tracking possible, as one example, the groove G is formed with a height in a range of 15 nm to 25 nm, inclusive and with a pitch (track pitch) between adjacent parts G, G of the groove in a range of 0.1 μm to 0.5 μm, inclusive. It should be noted that it is also possible to have the land (the concave part) function as the track, and on such a substrate, the land is formed with a depth in the above range of 15 nm to 25 nm, inclusive and with a track pitch between adjacent parts of the land in the above range of 0.1 μm to 0.5 μm, inclusive. It is also possible to have both the groove and the land function as tracks, and on such a substrate, the groove and the land are formed so that the depth from the upper surface of the groove on the incident side for the laser light L to the bottom surface of the land is in the above range of 15 nm to 25 nm, inclusive and the pitch between adjacent parts of the groove G and the land is in the above range of 0.1 μm to 0.5 μm, inclusive.

Figure 3:
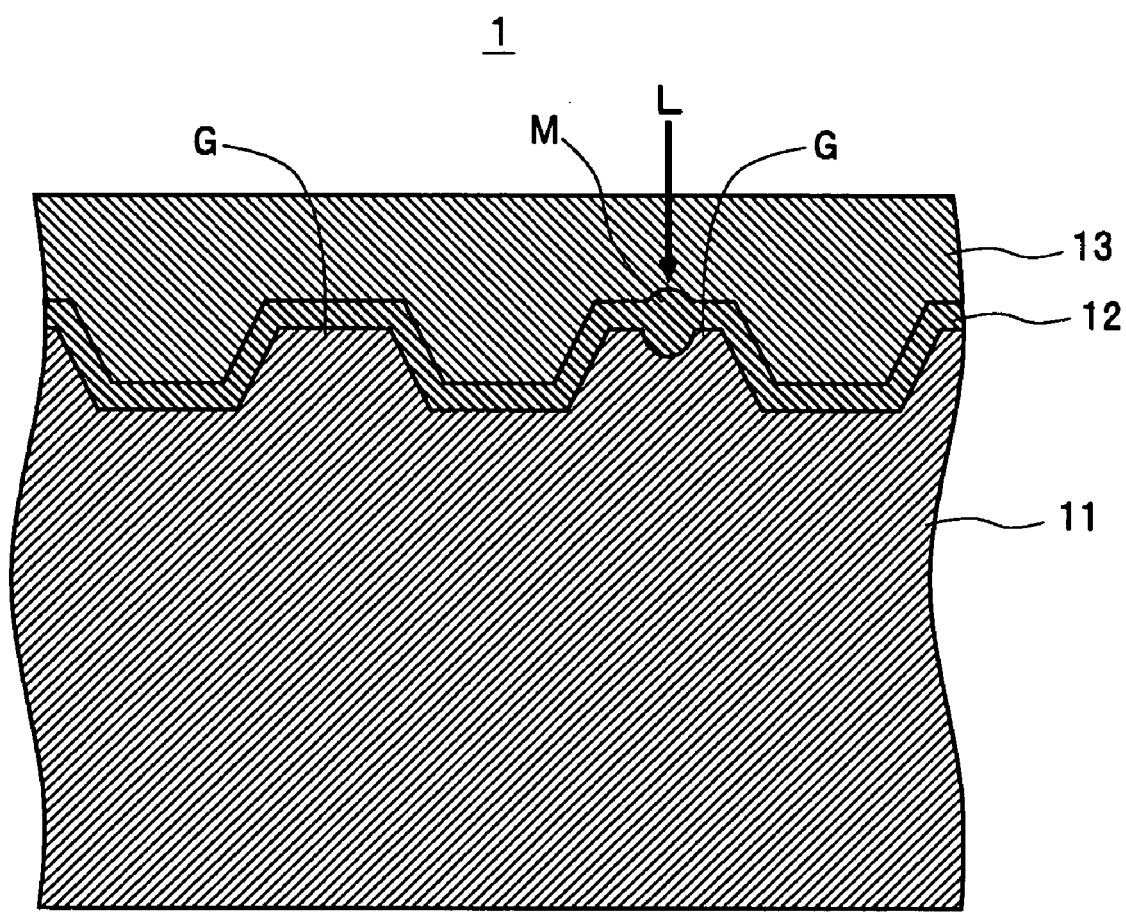
FIG. 3 is a cross-sectional view of a substrate, a recording layer, and a light transmitting layer in a state where recording marks have been formed.

The recording layer 12 is formed by sputtering, for example, on the surface of the substrate 11. As shown in FIG. 3, when the laser light L for recording data is irradiated during the recording of data, parts of the recording layer 12 irradiated with the laser light L deform (expand) and such deformation causes deformation in the substrate 11 and the light transmitting layer 13 (or one of the two) and thereby forms recording marks M, with the refractive index, attenuation coefficient, and transmissivity changing at the parts corresponding to the recording marks M. The recording layer 12 is formed of a single layer using a recording material that has predetermined elements as main components, the lower surface of the recording layer 12 directly contacts the upper surface of the substrate 11, and the upper surface of the recording layer 12 directly contacts the lower surface of the light transmitting layer 13. That is, the recording layer 12 is directly sandwiched between the substrate 11 and the light transmitting layer 13 with no other functional layers in between. The recording layer 12 is formed with a thickness in a range of 13 nm to 74 nm, inclusive. A recording material that has Zn, Si, Mg, O and S as main components, a recording material that has La, Si, Mg, O and S as main components, and a recording material that has Bi and O as main components, and the like can be used as the recording material that composes the recording layer 12. Here, the recording material that has Zn, Si, Mg, O and S as main components should preferably be formed so that the relative proportions of the respective elements (the proportions of the number of atoms of the respective elements relative to the total number of atoms of all elements) are 21.5%, 10.1%, 20.8%, 20.1%, and 27.5%, respectively. Also, the recording material that has La, Si, Mg, O and S as main components should preferably be formed so that the relative proportions of the respective elements are 6.2%, 24.1%, 23.1%, 24.6%, and 22.0%, respectively.

On the other hand, for a recording layer 12 constructed using the recording material that has Bi and O as main components, when the laser light L for recording data is irradiated, it is believed that Bi2O4 and Bi2O5 having unstable material characteristics and included in the recording material are broken down to the stable materials $Bi_2O_3$ and $O_2$, with parts of the recording layer 12 deforming due to the $O_2$ so that recording marks M are formed. The present inventors confirmed by experimentation that it is difficult to construct a recording material in which the proportion of O atoms with respect to the total number of Bi and O atoms (hereinafter referred to as the "O proportion") exceeds 77%. The inventors also confirmed by experimentation that when a recording material with a proportion of O with respect to the total number of Bi and O atoms of below 63% is used, the proportion of $Bi_2O_4$ and $Bi_2O_5$ in the recording layer 12 (the recording material) is too low, so that it is difficult to form favorable recording marks M. Accordingly, to make it possible to reliably form favorable recording marks from which data can be reliably read, the recording material that has Bi and O as main components should preferably be formed so that the O proportion is in a range of 63% to 77%, inclusive. In addition, the present inventors confirmed by experimentation that a recording layer 12 produced using the recording material that has Bi and O as main components has superior storage characteristics compared to recording layers 12 produced using the other recording materials. Accordingly, out of the recording materials described above, the recording material that has Bi and O as main components should preferably be used as the recording material that composes the recording layer 12.

In addition, the recording layer 12 can be constructed so as to internally include parts where the relative proportions of the respective elements described above differ somewhat from one another. More specifically, as one example in a central part in the thickness direction of the recording layer 12, the relative proportions of Bi and O can be set at 30% and 70%, respectively, while at the parts close to the substrate 11 and the light transmitting layer 13, the relative proportions can be set at 35% and 65%, respectively. That is, the expression "a recording layer 12 formed as a single layer" includes both a layer in which the proportions of the respective elements composing the recording material are the same across the entire layer and a layer including parts where the proportions of the respective elements somewhat differ to one another. In this case, when the difference between a maximum value and a minimum value of the relative proportion of O is set in a range of ±20%, by controlling the flow rate of $O_2$ gas supplied inside a chamber, it is possible to form the recording layer 12 using a single sputtering apparatus (a single chamber), so that the time taken and cost incurred by the formation process of the recording layer 12 can be reduced.

The light transmitting layer 13 corresponds to a resin layer, out of "the pair of resin layers" for the present invention, that is positioned on an incident side for laser light used for reading data, and is formed by applying (by spin coating) and hardening an acrylic resin that transmits light and is hardened by energy rays (as one example, UV rays) so that the thickness is around 100 μm and the Young's modulus is in a range of 415 MPa to 7100 MPa, inclusive. In this case, the thickness of the light transmitting layer 13 is not limited to 100 μm and it is possible to form the light transmitting layer 13 in a range of 30 μm to 200 μm, inclusive, by spin coating. Also, the applied material of the light transmitting layer 13 is not limited to an acrylic resin hardened by energy rays, and it is possible to use various resins or composite materials that transmit light. The method of forming the light transmitting layer 13 is not limited to spin coating and it is also possible to use a method that sticks on a film formed of the various kinds of resin mentioned above. When this method is used, it is possible to form the light transmitting layer 13 with around the same thickness as the substrate 11.

Next, the method of manufacturing the optical recording medium 1 will be described with reference to the drawings.

First, the substrate 11 is fabricated by injection molding polycarbonate. When doing so, a convex/concave pattern of a stamper that has been set inside an injection molding mold is transferred to form a convex/concave pattern (the groove G) in the surface side of the substrate 11. Here, the convex/concave pattern of the stamper is formed so that the height of the groove G is in a range of 15 nm to 25 nm, inclusive, and the pitch of the groove G is in a range of 0.1 μm to 0.5 μm, inclusive.

Next, a sputtering apparatus is used to form the recording layer 12 on a surface of the substrate 11 in which the convex/concave pattern has been formed. More specifically, a Bi target is set in the chamber of the sputtering apparatus and the substrate 11 is disposed inside the chamber. Next, $O_2$ gas is supplied inside the chamber at a flow rate of 15 sccm, for example. After this, Ar gas is supplied inside the chamber as a sputtering gas at a flow rate of 50 sccm, for example, and collides with the Bi target. At this time, the Bi particles that are scattered by the collisions with the sputtering gas accumulate on the substrate 11 while reacting with the $O_2$ gas inside the chamber and oxidizing. Here, the sputtering conditions are adjusted so that the proportion of the number of O atoms to the total number of Bi and O atoms is in a range of 63% to 77%, inclusive. By doing so, as shown in FIG. 2, the recording layer 12 is formed with a substantially uniform thickness along the convex/concave pattern of the substrate 11. It should be noted that although it is preferable to construct the recording layer 12 mainly of Bi and O, it is also possible to include other atoms, compounds, or the like, provided that the amount of such is small. In this case, when the included amount of other atoms, compounds, or the like is too high, the relative amount of Bi and O in the recording layer 12 falls, which makes it difficult to form recording marks from which data can be read reliably. Accordingly, the mixed proportion of other atoms, compounds, or the like aside from Bi and O should preferably be 25% or below, with 20% or below being more preferable and 10% or below being even more preferable.

Next, the light transmitting layer 13 is formed so as to cover the recording layer 12 by spin coating. More specifically, the substrate 11 is placed on a turntable in a state where the surface on which the recording layer 12 has been formed faces upwards. Next, a UV-hardening acrylic resin is dripped onto a central part of the substrate 11 while the turntable is rotated at low speed. Next, the turntable is rotated at high speed. At this time, the acrylic resin spreads with a substantially even thickness toward the outer circumferential part of the substrate 11 due to the centrifugal force that accompanies the rotation. Next, UV rays are irradiated onto the spread-out acrylic resin. By doing so, as shown in FIG. 2, the acrylic resin is hardened by the irradiation of the UV rays to form the light transmitting layer 13 so as to cover the recording layer 12. In this way, the optical recording medium 1 that includes the recording layer 12 which is sandwiched by the substrate 11 and the light transmitting layer 13 is completed.

Next, results of measuring the characteristics of the optical recording medium 1 will be described.

Before measuring was carried out, five types of optical recording media 1, (respectively referred to as an "optical recording medium 1A", an "optical recording medium 1B", an "optical recording medium 1C", an "optical recording medium 1D", and an "optical recording medium 1E") were manufactured in accordance with the method of manufacturing described above. In addition, two types of optical recording media 101A and 101B (hereinafter also referred to as the "optical recording media 101" when no distinction is required) respectively including a substrate 111, a recording layer 112, and a light transmitting layer 113 (see FIGS. 1 and 2) were manufactured as comparative examples. In this case, first the substrates 11 of the respective optical recording media 1 and the substrates 111 of the optical recording media 101 were respectively fabricated by injection molding using polycarbonate with a Young's modulus of around 2000 MPa. At this time, grooves G with a height of 20 nm and a pitch of 0.3 μm were formed in the surfaces of the substrates 11 and the substrates 111, respectively. Next, the Young's moduli of the substrates 11 and the substrates 111 were measured using a Nano Indentation Tester (ENT1100) made by ELIONIX CO., LTD. As a result, the Young's moduli of the substrates 11 and the substrates 111 were respectively 2152 MPa.

Next, the recording layers 12 were formed on the respective substrates 11 with a thickness set at 20 nm. The recording layers 112 were also formed on the respective substrates 111 with the same specification as the recording layers 12. Next, the light transmitting layers 13, whose respective thicknesses were set at 100 μm, were formed so as to cover the respective recording layers 12. The light transmitting layers 113, whose respective thicknesses were also set at 100 μm, were also formed so as to cover the respective recording layers 112. In this case, the light transmitting layer 13 of the optical recording medium 1A was formed using an acrylic resin with a Young's modulus of around 400 MPa and the light transmitting layer 13 of the optical recording medium 1B was formed using an acrylic resin with a Young's modulus of around 1100 MPa. The light transmitting layer 13 of the optical recording medium 1C was formed using an acrylic resin with a Young's modulus of around 2500 MPa and the light transmitting layer 13 of the optical recording medium 1D was formed using an acrylic resin with a Young's modulus of around 4000 MPa. In addition, the light transmitting layer 13 of the optical recording medium 1E was formed using a material with a Young's modulus of around 7000 MPa produced by mixing around 30% of an $SiO_2$ filler into an acrylic resin. The light transmitting layer 113 of the optical recording medium 101A was formed using an acrylic resin with a Young's modulus of around 5 MPa and the light transmitting layer 113 of the optical recording medium 101B was formed using an acrylic resin with a Young's modulus of around 60 MPa.

Next, using the Nano Indentation Tester (ENT1100) mentioned above, the Young's moduli of the respective light transmitting layers 13 and the respective light transmitting layers 113 were measured. As a result, as shown in Table 1, the Young's moduli of the light transmitting layers 13 of the optical recording media 1A to 1E were respectively 415 MPa, 1051 MPa, 2472 MPa, 4030 MPa, and 7100 MPa. Also, as shown in the same table, the Young's moduli of the respective light transmitting layers 113 of the optical recording media 101A and 101B were 5 MPa and 64 MPa, respectively.

TABLE 1

| | Young's modulus (MPa) | C/N (dB) | Increase in Noise (dB) |
|---|---|---|---|
| Optical recording medium 1A | 415 | 56.1 | 2.3 |
| Optical recording medium 1B | 1051 | 56.1 | 2.0 |
| Optical recording medium 1C | 2472 | 56.2 | 1.5 |
| Optical recording medium 1D | 4030 | 55.9 | 1.3 |
| Optical recording medium 1E | 7100 | 56.1 | 1.3 |
| Optical recording medium 101A | 5 | 53.2 | 5.6 |
| Optical recording medium 101B | 64 | 55.0 | 5.0 |

Next, using an optical recording medium evaluating apparatus (DDU1000) manufactured by PULSTEC INDUSTRIAL CO., LTD, the recording of 8 T marks was carried out according to an on-groove recording method with the following conditions: laser wavelength: 405 nm; modulation method: (1,7) RLL; linear recording velocity: 5.3 m/sec; channel bit length: 0.12 μm/bit; channel clock: 66 MHz; and recording power: 3.5 to 5.1 mW. After this, the C/N ratio of a read signal for the 8 T marks outputted from the optical recording medium evaluation apparatus mentioned above was measured using an XY180 spectrum analyzer (made by ADVANTEST CORPORATION) and the increase in noise before and after the recording of the 8 T marks was also measured. As a result, as shown in Table 1, for the optical recording media 1A to 1E, the respective C/N ratios were 56.1 dB, 56.1 dB, 56.2 dB, 55.9 dB, and 56.1 dB, with the increase in noise being 2.3 dB, 2.0 dB, 1.5 dB, 1.3 dB, and 1.3 dB, respectively. On the other hand, for the optical recording media 101A and 101B, the respective C/N ratios were 53.2 dB and 55.0 dB, with the increase in noise being 5.6 dB and 5.0 dB, respectively. Here, the present inventors confirmed by experimentation that the reading of data is carried out reliably when the C/N ratio exceeds 55 dB and the increase in noise is below 5.0 dB and that when the C/N ratio exceeds around 50 dB but the increase in noise is 5.0 dB or above, the reading of data is not sufficient. Accordingly, from the above measurement results, it is clear that the optical characteristics that are required for the reliable recording and reproduction of data are achieved when the substrate 11 and the light transmitting layer 13 are respectively formed with Young's moduli in the range of 415 MPa to 7100 MPa, inclusive. The present inventors also confirmed by experimentation that the reading of data is carried out even more reliably when the increase in noise is less than 2 dB. Accordingly, from the measurement results for the optical recording media 1C to 1E given above, it is clear that the optical characteristics required for an even more reliable recording and reproduction of data are achieved when the light transmitting layer 13 has been formed with a Young's modulus of a higher value (in this case in a range of 2472 MPa to 7100 MPa, inclusive) than the Young's modulus (in this case, 2152 MPa) of the substrate 11.

In this way, according to the optical recording medium 1, the optical characteristics required for a reliable recording and reproduction of data are achieved by directly sandwiching the recording layer 12 between the substrate 11 and the light transmitting layer 13 with no functional layers in between and setting the Young's moduli of the substrate 11 and the light transmitting layer 13 in a range of 415 MPa to 7100 MPa, inclusive. Accordingly, since it is possible to manufacture an optical recording medium 1 for which data can be reliably recorded and reproduced without providing functional layers such as an intermediate layer and a reflective layer, it is possible to simplify the manufacturing process of the optical recording medium 1 by an amount equivalent to the omission of the processes for forming such functional layers. As a result, the manufacturing cost of the optical recording medium 1 can reliably be reduced.

Also, the optical characteristics required for an even more reliable recording and reproduction of data can be achieved by forming the light transmitting layer 13 disposed on the incident side for the laser light L so as to have a higher Young's modulus than the Young's modulus of the substrate 11.

By forming the recording layer 12 using a recording material where the proportion of O atoms to the total number of Bi and O atoms is in a range of 63% to 77%, inclusive, it is possible to reliably record and read data using blue or blue-violet laser light L (i.e., laser light with a wavelength of around 350 to 450 nm).

It should be noted that the present invention is not limited to the above construction. For example, although the optical recording medium 1 has been described by way of an example where recording data is recorded and reproduced by irradiating the recording layer 12 with the laser light L from the side of the light transmitting layer 13 that is formed by spin coating or the like, it is also possible to apply the present invention to an optical disc where recording data is recorded and reproduced by irradiating laser light L toward the recording layer from the side of the disc substrate that serves as the light transmitting layer. More specifically, the information recording medium according to the present invention also includes an optical disc in which the recording layer is formed between a disc substrate with a thickness of around 1.1 mm as the light transmitting layer and a thin resin layer formed by spin coating or the like and an optical disc in which the recording layer is formed between a disc substrate that is around 0.6 mm thick as a light transmitting layer and another disc substrate (a so-called "dummy substrate) that is also around 0.6 mm thick. Also, although an example of an optical disc 1 with a single recording layer 12 has been described, it is also possible to apply the present invention to a multilayer information recording medium including a plurality of recording layers that are directly sandwiched by a pair of resin layers (various kinds of resin layers such as injection-molded substrates, resin layers formed by applying a resin material, and resin films). It should be noted that when the present invention is applied to a multilayer information recording medium, the Young's moduli of the pair of resin layers that contact at least one out of the plurality of recording layers should be in a range of 415 MPa to 7100 MPa, inclusive. In addition, the present invention can also be applied to a double-sided information recording medium where light transmitting layers are formed on both front and rear surfaces of the information recording medium. In this case, one or a number of recording layers may be present on the front and rear surface sides.

What is claimed is:
1. An information recording medium including a recording layer that is formed of a single layer of a single type of recording material and is directly sandwiched by a pair of resin layers, the information recording medium being constructed so that at least one resin layer out of the pair of resin layers deforms due to deformation of the recording layer that is caused by irradiation with laser light for recording data and a track pitch is in a range of 0.1 μm to 0.5 μm, inclusive, wherein:

the pair of resin layers are formed with respective Young's moduli in a range of 415 MPa to 7100 MPa, inclusive; and the recording material is formed of a material that includes elements Bi and O as main components and in which the proportion of O atoms with respect to the total number of Bi and O atoms is in a range of 63% to 77%, inclusive.

2. An information recording medium including a recording layer that is formed of a single layer of a single type of recording material and is directly sandwiched by a pair of resin layers, the information recording medium being constructed so that at least one resin layer out of the pair of resin layers deforms due to deformation of the recording layer that is caused by irradiation with laser light for recording data and a track pitch is in a range of 0.1 μm to 0.5 μm, inclusive, wherein:

the pair of resin layers are formed with respective Young's moduli in a range of 415 MPa to 7100 MPa, inclusive;

out of the pair of resin layers, a resin layer positioned on an incident side for laser light used for reading data is formed with a higher Young's modulus than a Young's modulus of another resin layer out of the pair of resin layers; and the recording material is formed of a material that includes elements Bi and O as main components and in which the proportion of O atoms with respect to the total number of Bi and O atoms is in a range of 63% to 77%, inclusive.

* * * * *